United States Patent
Saito et al.

(10) Patent No.: US 9,167,825 B2
(45) Date of Patent: Oct. 27, 2015

(54) METHOD FOR MANUFACTURING LIQUID FERMENTED MILK

(75) Inventors: Masato Saito, Odawara (JP); Yuka Aoyama, Odawara (JP); Masashi Yamamoto, Odawara (JP)

(73) Assignee: MEIJI CO., LTD., Tokyo (JP)

( * ) Notice: Subject to any disclaimer, the term of this patent is extended or adjusted under 35 U.S.C. 154(b) by 102 days.

(21) Appl. No.: 13/878,532

(22) PCT Filed: Oct. 11, 2011

(86) PCT No.: PCT/JP2011/073352
§ 371 (c)(1),
(2), (4) Date: Jun. 20, 2013

(87) PCT Pub. No.: WO2012/050094
PCT Pub. Date: Apr. 19, 2012

(65) Prior Publication Data
US 2013/0266692 A1   Oct. 10, 2013

(30) Foreign Application Priority Data

Oct. 12, 2010   (JP) .................................. 2010-229492

(51) Int. Cl.
*A23C 9/127* (2006.01)
*A23C 9/123* (2006.01)

(52) U.S. Cl.
CPC ................. *A23C 9/127* (2013.01); *A23C 9/123* (2013.01)

(58) Field of Classification Search
CPC ...... A23C 9/123; A23C 9/1238; A23C 9/127; A23C 2210/15; A23C 2270/05; A23C 9/1542; A23C 9/122
USPC .................... 426/43, 583, 519, 52, 429, 34, 7
See application file for complete search history.

(56) References Cited

U.S. PATENT DOCUMENTS 6,759,067 B1 *   7/2004   Ogasawara et al. ............. 426/34

FOREIGN PATENT DOCUMENTS

| CN | 101199299 A | 6/2008 |
|---|---|---|
| JP | 50-6745 A | 1/1975 |
| JP | 03-292853 A | 12/1991 |
| JP | 04-075555 A | 3/1992 |
| JP | 04-287636 A | 10/1992 |
| JP | 06-014706 A | 1/1994 |
| JP | 06-113737 A | 4/1994 |
| JP | 09-121763 A | 5/1997 |
| JP | 10-99018 A | 4/1998 |
| JP | 10-262550 A | 10/1998 |
| JP | 2000-270844 A | 10/2000 |
| JP | 2000-279086 A | 10/2000 |
| JP | 2002-095409 A | 4/2002 |
| JP | 2003-259802 A | 9/2003 |
| JP | 2005-245278 A | 9/2005 |

OTHER PUBLICATIONS

"Comprehensive Encyclopedia of Milk", Asakura Publishing Co., Ltd 1992, pp. 246 (English explanation discussed in the specification—a copy of the portion attached).
Bensmira Meriem, et al., "Effects of fermentation conditions and homogenization pressure on the rheological properties of Kefir", LWT Food Sci. Technol., Apr. 2010, vol. 43, No. 8, p. 1180-1184. (cited in the PCT Search Report).
Serra Mar et al., "Flavour profiles and survival of starter cultures of yoghurt produced from high-pressure homogenized milk", Int. Dairy J., 2009, vol. 19, No. 2, p. 100-106.
Ciron C.I.E., et al., "Comparison of the effects of high-pressure microfluidization and conventional homogenization of milk on particle size, water retention and texture of non-fat and low-fat yoghurts", Int. Dairy. J., May 2010, vol. 20, No. 5, p. 314-320.
Patrignani Francesca, et al., "Suitability of high pressure-homogenized milk for the production of probiotic fermented mik containing Lactobacillus paracasei and Lactobacillus acidophilus", J. Dairy Res., 2009, vol. 76, No. 1, p. 74-82.
International Search Report of the International Searching Authority mailed Nov. 8, 2011 for the corresponding international application No. PCT/JP2011/073352 (with English translation).
International Preliminary Report on Patentability and Written Opinion from the International Searching Authority mailed on Nov. 8, 2011 for the corresponding international application No. PCT/JP2011/073352 (with English translation).
Office Action issued in corresponding CN application No. 201180048437.7 (with partial English translation).

* cited by examiner

*Primary Examiner* — Hamid R Badr
(74) *Attorney, Agent, or Firm* — Posz Law Group, PLC

(57) ABSTRACT

A method is directed to producing liquid fermented milk, suppressing an increase in acidity and a decrease in pH over time during refrigerated storage, keeping a refreshing flavor (sour taste) originating from yogurt lactic acid bacteria for a long time, and suppressing production of an acid during storage to maintain good quality, without requiring heating after a fermentation step, use of a particular additive, and the like. The method for producing liquid fermented milk which uses a rod-shaped lactic acid bacteria and a coccus-shaped lactic acid bacteria as lactic acid bacteria to be added to a raw material for fermented milk, and which includes a homogenization step of obtaining the liquid fermented milk at a homogenization pressure of from 50 MPa to 100 MPa.

6 Claims, No Drawings

METHOD FOR MANUFACTURING LIQUID FERMENTED MILK

CROSS REFERENCE TO RELATED APPLICATIONS

This application is a U.S. national stage application of PCT/JP2011/073352 filed on Oct. 11, 2011, and claims priority to, and incorporates by reference, Japanese Patent Application No. 2010-229492 filed on Oct. 12, 2010.

TECHNICAL FIELD

The present invention relates to a method for producing liquid fermented milk.

BACKGROUND ART

According to "Ministerial Ordinance Regarding Compositional Standards, etc. of Milk and Dairy Products", fermented milk is defined as a product obtained by subjecting milk or a milk-like substance or the like containing solid non-fat in an amount not less than that of milk to fermentation with a lactic acid bacterium or yeast to form a paste or a liquid, or a frozen product thereof. The fermented milk is broadly classified into: (a) hard yogurt (i.e. solid fermented milk or set type yogurt) obtained mainly by filling its material into a container and then fermentating and solidifying the material in the container; (b) soft stirred type yogurt (i.e. pasty fermented milk) obtained by fermentation in a large tank or the like, and subsequent curd pulverization and optional mixing with pulp, sauce, or the like, followed by filling the obtained mixture into a container; and (c) drinkable yogurt (i.e. liquid fermented milk) obtained by fine crushing of hard yogurt or soft stirred type yogurt with a homogenizer or the like to enhance properties as a liquid, optional mixing with fruit pulp, sauce, or the like, and subsequent filling into a container.

According to the compositional standards for fermented milk in Japan (Ministerial Ordinance Regarding Compositional Standards, etc. of Milk and Dairy Products), the ratio of solid non-fat (i.e. milk solid non-fat) should be 8.0% or more, and the number of lactic acid bacteria or yeast cells per mL should be 10,000,000 or more. Further, according to the international standards for yogurt defined by FAO/WHO, yogurt is defined as follows: "Yogurt is a coagulated dairy product obtained by subjecting milk or a dairy product to lactic acid fermentation through actions of *Lactobacillus bulgaricus* and *Streptococcus thermophilus*. Additives (e.g., milk powder, skim milk powder, whey powder, and the like) can be used optionally. Microorganisms as described above in the final product must be viable and abundant."

Because fermented milk contains viable cells such as lactic acid bacteria, an increase in acidity and a decrease in pH occur owing to lactic acid and the like to be generated by the lactic acid bacteria when the fermented milk is stored for a long period of time. Therefore, owing to the increase in acidity and the decrease in pH over time, it has been difficult to keep flavor and quality constant as compared to those of a product immediately after production.

In order to solve this problem, various methods have been proposed heretofore. For example, there is a proposal concerning a method for producing yogurt containing viable lactic acid bacterium cells which comprises adding a lactic acid bacterium to a yogurt material composition to control a fermentation degree of milk in the composition to a desired one; leaving the resultant to stand at low temperature, followed by heating under such temperature and time conditions that the temperature is not lower than the limit temperature for growth arrest of the lactic acid bacterium at the high-temperature side but complete killing is not achieved; and cooling the resultant (see Patent Literature 1). Further, there is a proposal concerning fermented milk containing chitosan by which an increase in acidity can be suppressed (see Patent Literature 2).

The technology described in Patent Literature 1 involves the heating treatment after the fermentation step, and has problems in that setting and adjustment of the heating conditions are complicated, excessive supply of heat energy is required, and the flavor of yogurt may be deteriorated owing to the heating treatment. In addition, the technology described in Patent Literature 2 involves using chitosan, which is not contained in general fermented milk, as an additive, and hence has a problem in that the flavor of the fermented milk may be changed.

In addition, as other means for suppressing production of acids, there have been known, for example, a method involving adding a peroxidase (see Patent Literature 3), a method involving using *Lactobacillus helveticus* and *Lactobacillus acidophilus* in combination (see Patent Literature 4), a method involving giving a heat shock at a predetermined temperature for a predetermined time after the end of fermentation (see Patent Literature 5), a method involving using a low-temperature-sensitive lactic acid bacterium (Patent Literature 6), a method involving adding *Lactococcus lactis* subsp. Lactis capable of producing nisin (Patent Literature 7), and a method involving maturing a fermented product at an ice temperature range after the end of fermentation (Patent Literature 8).

However, each of those methods has problem in that another additive such as the peroxidase is further added, applicable lactic acid bacteria are limited, or production may be complicated by introducing an additional step such as the heat shock treatment or the ice-temperature maturation. Yogurt is supported by consumers because of its natural and refreshing flavor obtained from its moderate acidity. However, when the acidity is suppressed during storage of the yogurt by the conventional technologies, it cannot be avoided that its natural and refreshing flavor is lost.

On the other hand, there is known a method involving liquefying gel-like fermented milk obtained by fermentation of milk by homogenization at a homogenization pressure of 100 to 150 kg/cm$^2$ (i.e. 10 to 15 MPa) (see Non-Patent Literature 1). However, the purpose of the method is to crush the cooled fermented milk finely to liquefy the milk.

CITATION LIST

List of Patent Literatures

Patent Literature 1: JP S50-6745 A
Patent Literature 2: JP H03-292853 A
Patent Literature 3: JP H10-262550 A
Patent Literature 4: JP H10-99018 A
Patent Literature 5: JP H09-121763 A
Patent Literature 6: JP 2000-270844 A
Patent Literature 7: JP H04-287636 A
Patent Literature 8: JP 2003-259802 A

Non-Patent Literatures

[Non-Patent Literature 1] "Comprehensive Encyclopedia of Milk", Asakura Publishing Co., Ltd., pp. 246, published in 1992

SUMMARY OF THE INVENTION

Problems to be Solved by the Invention

Therefore, an object of the present invention is to provide a method for producing liquid fermented milk which is for suppressing an increase in acidity and a decrease in pH over time during refrigerated storage, keeping a refreshing flavor (sour taste) originating from yogurt lactic acid bacteria (for example, a combination of *Lactobacillus bulgaricus* and *Streptococcus thermophilus*) for a long time, and suppressing production of acids during storage to maintain good quality, without requiring complicated operations such as heating after a fermentation step and use of a particular additive.

Means for Solving the Problem

The inventors of the present invention have made extensive studies in view of the above-mentioned conventional problems, and as a result, have found that, when a homogenization pressure in a homogenization step of homogenizing fermented milk to liquefy the milk is set to a pressure (50 to 100 MPa) higher than a conventional one (10 to 15 MPa) production of an acid during refrigerated storage can be suppressed more than ever before while the flavor and texture similar to those of conventional liquid fermented milk are kept.

That is, hitherto, in the case of production of liquid fermented milk, it has been common general knowledge for those skilled in the art that gel-like fermented milk is sufficiently liquefied at a homogenization pressure of 10 to 15 MPa, and a pressure higher than the pressure is unnecessary for liquefaction. However, the inventors of the present invention have employed homogenization pressures of from 50 to 100 MPa, and first found liquid fermented milk having a significantly excellent effect unpredictable from conventional technologies.

A method for producing liquid fermented milk according to the present invention uses a rod-shaped lactic acid bacteria and a coccus-shaped lactic acid bacteria as lactic acid bacteria to be added to a raw material for fermented milk, and includes a homogenization step of obtaining the liquid fermented milk at a homogenization pressure of from 50 MPa to 100 MPa. According to the present invention, it is possible to suppress changes in acidity and/or pH over time of liquid fermented milk of the present invention or a fermented dairy product containing the liquid fermented milk of the present invention.

The homogenization pressure is preferably 50 MPa to 90 MPa, more preferably 50 MPa to 85 MPa, still more preferably 60 MPa to 85 MPa, particularly preferably 70 MPa to 85 MPa.

Further, in the above-mentioned method, it is preferred that the rod-shaped lactic acid bacteria to be used include *Lactobacillus bulgaricus* and the coccus-shaped lactic acid bacteria to be used include *Streptococcus thermophilus*.

Further, the liquid fermented milk to be produced by the production method according the present invention may be used as a pre-fermentation type drinkable yogurt, a raw material (i.e. one of the components) for the pre-fermentation type drinkable yogurt, a viable cell type lactic acid bacteria beverage, a raw material (i.e. one of the components) for the viable cell type lactic acid bacteria beverage, or the like.

Further, when the liquid fermented milk produced by the production method according to the present invention is stored at a temperature of 10° C. for 25 days from the end of fermentation, a change in acidity in the liquid fermented milk after the 25 days is preferably 0.25% or less, more preferably 0.23% or less, still more preferably 0.20% or less, particularly preferably 0.19% or less.

Advantageous Effects of the Invention

According to the present invention, it is possible to suppress an increase in the acidity and a decrease in the pH over time during refrigerated storage without heating or using various additives for suppressing production of an acid during the storage after the end of fermentation, to keep a refreshing flavor originating from yogurt lactic acid bacteria and the number of lactic acid bacteria necessary for yogurt for a long time, and to suppress a change in the flavor during distribution or storage after production more effectively than ever before. Therefore, it becomes possible to produce liquid fermented milk having suppressed sour taste and to extend the expiration date of the liquid fermented milk. In addition, it is possible to suppress an increase in the sour taste over time, and hence the amount of an additive such as a sweetener used heretofore for suppressing the increase in the sour taste can be reduced. Therefore, it is possible to provide liquid fermented milk having original mellow and refreshing flavor and moderate sour taste. Further, the reduction in the amount of the sweetener can be expected to provide an effect of dieting.

In addition, the present invention can be carried out only by setting the homogenization pressure to the value specified by the present invention in the homogenization step in a general production line of liquid fermented milk, or only by adopting a homogenizer corresponding to the pressure range specified by the present invention. Therefore, a complicated production step is not required, and economical effects (i.e. effects of reducing production cost) of the method are large.

EMBODIMENTS FOR CARRYING OUT THE INVENTION

Hereinafter, the present invention is described in detail. However, the present invention is not limited to individual embodiments described below.

The term of "raw material for fermented milk" as used herein refers to a liquid containing a milk constituent such as raw milk, whole milk, skim milk, or whey. In this case, the raw milk is, for example, animal milk such as cow's milk. In addition to whole milk, skim milk, whey or the like, the raw material for fermented milk may contain a processed product thereof (e.g. whole milk powder, condensed whole milk, skim milk powder, condensed skim milk, condensed milk, whey powder, cream, butter, or cheese). It should be noted that the raw material for fermented milk is one generally called yogurt mix or the like, and may contain, in addition to the milk constituent, for example, a food or a food ingredient and a food additive such as sugar, a saccharide, a sweetener, a flavoring agent, fruit juice, pulp, a vitamin, or a mineral. Further, the raw material for fermented milk may contain a stabilizer such as pectin, a soybean polysaccharide, carboxymethylcellulose (CMC), agar, or gelatin as necessary.

Herein, the "fermented milk" is, for example, post-fermentation type yogurt such as set type yogurt or plain yogurt. Examples of the "fermented dairy product" and "final product" include liquid fermented milk and a lactic acid bacteria beverage, such as a drinkable yogurt prepared by mixing an auxiliary raw material such as a sugar solution in fermented milk. Here, examples of the auxiliary raw material include the foods, food ingredients, food additives, and stabilizers listed above as examples of the raw material for the fermented milk.

A lactic acid bacterium (i.e. starter) to be added to and mixed (i.e. inoculated) in the raw material for fermented milk is, for example, one kind or two or more kinds of bacteria selected from: lactic acid bacilli (i.e. rod-shaped lactic acid bacteria) such as *Lactobacillus bulgaricus* and *Lactobacillus lactis*; lactic acid cocci (i.e. coccus-shaped lactic acid bacteria) such as *Streptococcus thermophilus*; other lactic acid bacteria and yeast generally used for production of fermented milk; and the like.

Preferred lactic acid bacteria to be used in the present invention are a combination of *Lactobacillus bulgaricus* as the rod-shaped lactic acid bacteria and *Streptococcus thermophilus* as the coccus-shaped lactic acid bacteria.

The combination of *Lactobacillus bulgaricus* and *Streptococcus thermophilus* is desirable because the combination imparts unique mellow and refreshing flavor to yogurt, resulting in high palatability, and the combination of the bacteria is accepted as the bacteria for a yogurt by the international standard. In the present invention, use of at least *Lactobacillus bulgaricus* as the rod-shaped lactic acid bacteria and at least *Streptococcus thermophilus* as the coccus-shaped lactic acid bacteria is desirable from the viewpoint of exerting the effect of the present invention sufficiently. It should be noted that, in the present invention, it is not necessary to use mutants having specific properties as the rod-shaped lactic acid bacteria and coccus-shaped lactic acid bacteria, and general bacterial strains may be used.

A preferred example of the fermented dairy product containing the liquid fermented milk of the present invention is a pre-fermentation type drinkable yogurt. In general, the change in the sensuous sour taste (i.e. flavor) caused by an increase in the acidity and a decrease in the pH during refrigerated storage is the largest in a liquid drinkable yogurt (pre-fermentation type) among various forms of the fermented milk. In addition, there are yogurt-based beverages containing lactic acid bacteria (i.e. viable cells of the bacteria) such as lactic acid bacteria beverages as forms similar to the drinkable yogurt, although the lactic acid bacteria beverages are not included in the definition of the fermented milk in Japan. Also in such yogurt-based beverages, the effect of the present invention can be expected. Therefore, the "liquid fermented milk" of the present invention includes the liquid drinkable yogurt (pre-fermentation type) and the yogurt-based beverages.

A gelatinized yogurt (i.e. soft stirred type yogurt) or a solid yogurt (i.e. re-set yogurt) in which an increase in the acidity during refrigerated storage is suppressed can be produced using the liquid fermented milk (e.g. drinkable yogurt) of the present invention as a raw material by adding any food raw material and/or food additive to the main raw material, and thickening, gelatinizing, and solidifying the mixture while the lactic acid bacteria in the liquid fermented milk are kept viable. The liquid fermented milk of the present invention may be used for other applications.

In the present description, the term of "acidity" refers to a value measured according to "5. Method for measuring acidity of milk and dairy products" described on page 56 in "Laws and Ordinances Regarding Milk" (Association of Dairy Companies for Hygiene, which is "Nyugyo Dantai Eisei Renraku Kyogikai" in Japanese; March 2004), and details are as follows. Specifically, in the present description, the term of "acidity" refers to an acidity measured based on the following method. "10 ml of water free from carbon dioxide is added to 10 ml of a sample to dilute the sample. 0.5 ml of phenolphthalein liquid is added as an indicator, and titration is carried out with a 0.1 mol/L sodium hydroxide solution until the faint pink color persists for 30 seconds. The percentage of the lactic acid per 100 g of the sample is determined from the titer and is regarded as the acidity. 1 ml of the 0.1 mol/L sodium hydroxide solution corresponds to 9 mg of lactic acid. The indicator is prepared by dissolving 1 g of phenolphthalein in 50% ethanol to obtain a volume of 100 ml."

The method for producing liquid fermented milk according to the present invention may include a sterilization step, a fermentation step, a cooling step, a curd-pulverizing step such as a homogenization step, an auxiliary raw material-adding step, and the like. When the homogenization pressure in the homogenization step is adjusted to a range specified in the present invention, it is possible to suppress the increase in the acidity and the decrease in the pH over time during refrigerated storage after production.

The homogenization pressure employed in the homogenization step in the case of production of typical fermented milk, in particular, a drinkable yogurt is about 10 to 15 MPa. In the present invention, the homogenization pressure (which means a total value in the case of two stages) is 50 MPa to 100 MPa, preferably 50 MPa to 90 MPa, more preferably 50 MPa to 85 MPa, still more preferably 60 MPa to 85 MPa, particular preferably 70 MPa to 85 MPa. When the homogenization is carried out in such range, it is possible to suppress an increase in the acidity and a decrease in the pH over time during refrigerated storage and to produce a drinkable yogurt capable of keeping a refreshing flavor originating from yogurt lactic acid bacteria for a long time without adding a heating step or without using an additive for suppressing production of an acid during storage. When the homogenization pressure exceeds 100 MPa, it is necessary to use a high-performance apparatus as pressurization means for the homogenization treatment, resulting in low economic efficiency.

The homogenization treatment may be carried out as a treatment including one or more stages. The number of stages of the homogenization treatment is preferably one or two, more preferably two.

When the number of stages of the homogenization treatment is two, the homogenization pressure of the first stage is preferably 30 MPa to 100 MPa, more preferably 35 to 100 MPa, still more preferably 40 to 100 MPa, still more preferably 45 to 100 MPa, still more preferably 60 to 100 MPa, still more preferably 70 to 95 MPa, still more preferably 75 to 90 MPa, particularly preferably 80 to 90 MPa, and the homogenization pressure of the second stage is preferably 20 MPa or less, more preferably 1 to 20 MPa, still more preferably 2 to 15 MPa, still more preferably 3 to 10 MPa, particularly preferably 3 to 8 MPa.

In addition, the number of the lactic acid bacteria in the liquid fermented milk after the homogenization treatment satisfies a standard (i.e. 10,000,000 cfu/ml or more as a total number) of fermented milk (i.e. yogurt). In each of the liquid fermented milk of the present invention and the fermented dairy product containing the liquid fermented milk, it is possible to suppress an increase in the acidity and a decrease in the pH during a storage period without showing significant differences in various physical properties (for example, the number of viable cells of the bacteria) as a product compared with liquid fermented milk that is treated at a usual homogenization pressure and does not fall within the scope of the present invention (for example, a yogurt product which satisfies the above-mentioned standard immediately after production).

In the homogenization step, in which fermented milk is liquefied, in the method for producing liquid fermented milk according to the present invention, conditions other than adjusting the homogenization pressure are not particularly limited. Specifically, a method involving cooling fermented milk in advance and homogenizing the milk; a method involving homogenizing fermented milk immediately after fermentation and cooling the milk; and a method involving cooling fermented milk in a stepwise fashion, homogenizing the milk, and further cooling the milk; or the like can be employed.

The apparatus for homogenizing fermented milk is not particularly limited as long as the homogenization pressure can be set within the predetermined range of the present invention. Examples of the homogenizer that can carry out the present invention include so-called "high-pressure homogenizer". Although the advantageous effect of the present invention was confirmed in the case of using the "high-pressure homogenizer", the apparatus in the present invention is not particularly limited to the "high-pressure homogenizer", and any apparatus may be applied to the method for producing liquid fermented milk according to the present invention as long as the apparatus has a similar effect.

In the method for producing liquid fermented milk according to the present invention, any production step known for liquid fermented milk such as a drinkable yogurt or a lactic acid bacteria beverage may be applied except that the fermented milk is liquefied at the predetermined homogenization pressure, and a special step is not required except for the condition of the homogenization pressure.

When the liquid fermented milk of the present invention is stored at a temperature of 10° C. for 25 days after the end of fermentation, the change (i.e. the difference of increase) in the acidity after the 25 days is preferably 0.25% or less, more preferably 0.23% or less, still more preferably 0.20% or less, particularly preferably 0.19% or less.

The lower limit of the change (i.e. the difference of increase) in the acidity is not particularly limited, and is 0.10%, for example.

In the case where the liquid fermented milk of the present invention is stored at a temperature of 10° C. for 25 days after the end of fermentation, the acidity after the 25 days is preferably 1.00% or less, more preferably 0.99% or less, still more preferably 0.98% or less, particularly preferably 0.95% or less.

The lower limit of the acidity is not particularly limited, and is 0.80%, for example.

When the liquid fermented milk of the present invention is stored at a temperature of 10° C. for 7 days after the end of fermentation, the change (i.e. the difference of increase) in the acidity after the 7 days is preferably 0.15% or less, more preferably 0.13% or less, still more preferably 0.12% or less, particularly preferably 0.09% or less.

The lower limit of the change (i.e. the difference of increase) in the acidity is not particularly limited, and is 0.05%, for example.

When the liquid fermented milk of the present invention is stored at a temperature of 10° C. for 7 days after the end of fermentation, the acidity after the 7 days is preferably 0.91% or less, more preferably 0.90% or less, still more preferably 0.89% or less, particularly preferably 0.85% or less.

The lower limit of the acidity is not particularly limited, and is 0.80%, for example.

When the liquid fermented milk of the present invention is stored at a temperature of 10° C. for 25 days after the end of fermentation, the change (i.e. the difference of decrease) in the pH after the 25 days is preferably 0.27 or less, more preferably 0.26 or less, still more preferably 0.25 or less, particularly preferably 0.24 or less.

The lower limit of the change (i.e. the difference of decrease) in the pH is not particularly limited, and is 0.15, for example.

When the liquid fermented milk of the present invention is stored at a temperature of 10° C. for 25 days after the end of fermentation, the pH after the 25 days is preferably 3.85 or more, more preferably 3.90 or more, still more preferably 3.92 or more, particularly preferably 3.94 or more.

The upper limit of the pH is not particularly limited, and is 4.20, for example.

When the liquid fermented milk of the present invention is stored at a temperature of 10° C. for 7 days after the end of fermentation, the change (i.e. the difference of decrease) in the pH after the 7 days is preferably 0.17 or less, more preferably 0.16 or less, still more preferably 0.15 or less.

The lower limit of the change (i.e. the difference of decrease) in the pH is not particularly limited, and is 0.10, for example.

When the liquid fermented milk of the present invention is stored at a temperature of 10° C. for 7 days after the end of fermentation, the pH after the 7 days is preferably 4.00 or more, more preferably 4.01 or more, still more preferably 4.03 or more.

The upper limit of the pH is not particularly limited, and is 4.20, for example.

When the change in the acidity and the change in the pH over time based on the production method for liquid fermented milk according to the present invention fall within the above-mentioned ranges, the expiration date of the liquid fermented milk can be extended sufficiently.

In general, in order to suppress the sour taste (i.e., in order to make the flavor mild) of fermented milk such as the liquid fermented milk or a fermented dairy product, a sweetener or the like is added to enhance the sweet taste, thereby controlling a balance between the sour taste and the sweet taste so as to improve palatability. In this regard, in the present invention, for example, when the change in the acidity and the change in the pH over time fall within the above-mentioned ranges, it is possible to sufficiently suppress the increase in the sour taste originating from the liquid fermented milk over time and to decrease the amount of an additive such as the sweetener used heretofore. Therefore, the liquid fermented milk of the present invention has a refreshing sour taste while maintaining original mellow and refreshing flavor. In addition, the liquid fermented milk of the present invention does not require an excessive amount of the sweetener, and hence can contribute to the effect of dieting.

EXAMPLES

Hereinafter, the present invention is described in more detail by way of Examples. However, the present invention is not limited thereto.

A raw material (i.e. yogurt mix) for fermented milk was prepared by mixing 723 g of skim milk powder and 4,177 g of tap water. The resultant raw material for fermented milk was subjected to heat sterilization at 95° C. for 10 minutes and then cooled to 45° C. Next, 100 g of a mixed starter of *Lactobacillus bulgaricus* and *Streptococcus thermophilus* each isolated from "Meiji Bulgaria Yogurt" was inoculated in the cooled raw material for fermented milk. The resultant was subjected to fermentation in a tank at 43° C., and cooled to 10° C. or less when the acidity of lactic acid reached 1.20%. Thus, fermented milk was obtained.

The resultant fermented milk was homogenized using a homogenizer (manufactured by SANWA MACHINE CO., INC.) having a processing power of about 190 L/H under various conditions: 85 MPa (first stage: 80 MPa, second stage: 5 MPa, Example 1); 50 MPa (first stage: 45 MPa, second stage: 5 MPa, Example 2); and 15 MPa (first stage: 10 MPa, second stage: 5 MPa, Comparative Example 1), thereby obtaining liquid fermented milks. Each of the liquid fermented milks and a sugar solution (i.e. an aqueous solution obtained by blending 5.5 mass % of sugar, 18 mass % of high-fructose corn syrup, and 0.6 mass % of pectin) were mixed at a mass ratio of 6:4. Thus, liquid fermented dairy products (i.e. drinkable yogurts) which were final products were obtained.

The resultant liquid fermented dairy products were stored at 10° C., and changes in the acidity (Table 1), pH (Table 2), viscosity (Table 3), numbers of viable cells of the rod-shaped lactic acid bacteria and the coccus-shaped lactic acid bacteria (Tables 4 and 5) over time of each liquid fermented dairy product were examined while regarding the end of fermentation as a starting point. It should be noted that the numbers of viable cells of the rod-shaped lactic acid bacteria and the coccus-shaped lactic acid bacteria are values determined by counting the numbers of colonies (i.e. colony forming unit (cfu/ml)) per ml of each fermented dairy product.

The liquid fermented milk of Comparative Example 1 treated at an ordinary homogenization pressure (15 MPa) was found to have: a pH of 3.94 and an acidity of 0.92% after 7 days from the end of fermentation; a pH of 3.84 and an acidity of 1.04% after 25 days from the end of fermentation; and a pH of 3.86 and an acidity of 1.06% after 38 days from the end of fermentation. The liquid fermented milk of Example 1 treated at a homogenization pressure of 85 MPa was found to have: a pH of 4.03 and an acidity of 0.85% after 7 days from the end of fermentation; a pH of 3.94 and an acidity of 0.95% after 25 days from the end of fermentation; and a pH of 3.98 and an acidity of 0.97% after 38 days from the end of fermentation. The liquid fermented milk of Example 2 treated at a homogenization pressure of 50 MPa was found to have: a pH of 4.01 and an acidity of 0.89% after 7 days from the end of fermentation; a pH of 3.90 and an acidity of 0.99% after 25 days from the end of fermentation; and a pH of 3.94 and an acidity of 1.01% after 38 days from the end of fermentation.

As shown in Tables 1 and 2, in Examples 1 and 2 where the liquid fermented milk was treated at homogenization pressures within the range specified by the present invention (i.e. 50 MPa and 85 MPa), the increases in the acidity and the decreases in the pH were suppressed during the storage periods compared with Comparative Example 1 where the liquid fermented milk was treated at the conventional homogenization pressure.

TABLE 1

Change in acidity over time in liquid fermented milk

| Acidity (%) | Homogenization pressure MPa | Number of days elapsed (days) | | | |
|---|---|---|---|---|---|
| | | 0 | 7 | 25 | 38 |
| Example 1 | 85 | 0.76 | 0.85 | 0.95 | 0.97 |
| Example 2 | 50 | 0.77 | 0.89 | 0.99 | 1.01 |
| Comparative Example 1 | 15 | 0.76 | 0.92 | 1.04 | 1.06 |

TABLE 2

Change in pH over time in liquid fermented milk

| pH | Homogenization | Number of days elapsed (days) | | | |
|---|---|---|---|---|---|
| (—) | pressure MPa | 0 | 7 | 25 | 38 |
| Example 1 | 85 | 4.18 | 4.03 | 3.94 | 3.98 |
| Example 2 | 50 | 4.15 | 4.01 | 3.90 | 3.94 |
| Comparative Example 1 | 15 | 4.12 | 3.94 | 3.84 | 3.86 |

The viscosities of the products of Examples 1 and 2 and Comparative Example 1 were measured as indices of the texture of the liquid fermented milk. As shown in Table 3, the viscosities were found to fall within the range of from 15 to 25 mPa during the storage periods, and there were no effects of varying the storage period and the homogenization pressure.

TABLE 3

Change in viscosity over time in liquid fermented milk

| Viscosity | Homogenization | Number of days elapsed (days) | | | |
|---|---|---|---|---|---|
| (mPa) | pressure MPa | 0 | 7 | 25 | 38 |
| Example 1 | 85 | 22 | 18 | 18 | 19 |
| Example 2 | 50 | 19 | 17 | 16 | 20 |
| Comparative Example 1 | 15 | 20 | 17 | 19 | 22 |

As shown in Tables 4 and 5, the numbers of the lactic acid bacteria in the liquid fermented milk produced in Example 1, Example 2, and Comparative Example 1 (the total number of rod-shaped lactic acid bacteria and coccus-shaped lactic acid bacteria) were found to satisfy the standard (10,000,000 cfu/ml or more as total number) of fermented milk (i.e. yogurt) during the storage periods. Therefore, the liquid fermented milk produced in each of Examples 1 and 2 was found to have less changes in various properties such as the quality (for example, the number of viable cells) as the fermented milk compared with the liquid fermented milk produced in Comparative Example 1 and to suppress the increase in the sour taste caused by the increase in the acidity and the decrease in the pH during storage.

TABLE 4

Change in number of viable cells of rod-shaped lactic acid bacteria over time in liquid fermented milk

| Rod-shaped lactic acid bacteria | Homogenization | Number of days elapsed (days) | | | |
|---|---|---|---|---|---|
| ($\log_{10}$ cfu/ml) | pressure MPa | 0 | 7 | 25 | 38 |
| Example 1 | 85 | 7.00 | 7.06 | 7.04 | 6.81 |
| Example 2 | 50 | 7.56 | 7.45 | 7.15 | 7.19 |
| Comparative Example 1 | 15 | 7.89 | 7.91 | 7.66 | 7.45 |

TABLE 5

Change in number of viable cells of coccus-shaped lactic
acid bacteria over time in liquid fermented milk

| Coccus-shaped lactic acid bacteria | Homogeni-zation | Number of days elapsed (days) | | | |
|---|---|---|---|---|---|
| (log$_{10}$ cfu/ml) | pressure MPa | 0 | 7 | 25 | 38 |
| Example 1 | 85 | 9.10 | 9.06 | 8.90 | 8.41 |
| Example 2 | 50 | 9.21 | 9.12 | 8.99 | 8.33 |
| Comparative Example 1 | 15 | 9.20 | 9.14 | 8.89 | 8.67 |

INDUSTRIAL APPLICABILITY

According to the method for producing liquid fermented milk of the present invention, it is possible to suppress an increase in acidity and a decrease in pH of liquid fermented milk over time during refrigerated storage without performing an additional treatment or using various additives for suppressing production of an acid. Therefore, it is possible to maintain a refreshing flavor originating from yogurt lactic acid bacteria and the number of the lactic acid bacteria necessary for yogurt for a long time. Therefore, the present invention has very high industrial applicability.

The invention claimed is:

1. A method for producing a homogenized fermented milk product having an extended shelf life, which comprises:
    preparing a milk-containing material by inoculating milk or liquid containing a processed milk product with a mixture of bacteria including a rod-shaped lactic acid bacterium and a coccus-shaped lactic acid bacterium;
    preparing a fermented milk material by fermenting the milk-containing material; and
    homogenizing the fermented milk material at a homogenization pressure of from 50 MPa to 100 MPa to produce the homogenized fermented milk product comprising live lactic acid bacteria.

2. The method for producing a homogenized fermented milk product according to claim 1, wherein the homogenization pressure is from 50 MPa to 85 MPa.

3. The method for producing a homogenized fermented milk product according to claim 1, wherein the rod-shaped lactic acid bacterium comprises *Lactobacillus bulgaricus* and the coccus-shaped lactic acid bacterium comprises *Streptococcus thermophilus*.

4. The method for producing a homogenized fermented milk product according to claim 1, wherein the homogenized fermented milk product is selected from the group consisting of a drinkable yogurt, a yogurt product for producing the drinkable yogurt, a lactic acid bacteria-containing beverage containing viable cells of the mixture of bacteria, and an intermediate product containing the homogenized fermented milk product.

5. The method for producing a homogenized fermented milk product according to claim 1, wherein the homogenized fermented milk product has a change in acidity of 0.25% or less when stored for 25 days at a temperature of 10° C.

6. A homogenized fermented milk product, which is produced by the method for producing homogenized fermented milk product according to claim 1.

* * * * *